(12) United States Patent
Stahlhut et al.

(10) Patent No.: US 8,037,569 B2
(45) Date of Patent: Oct. 18, 2011

(54) WIPER ARM ASSEMBLY HAVING A LOCKING MEMBER

(75) Inventors: Alan J. Stahlhut, Valparaiso, IN (US); Richard Herring, Granger, IN (US); Deborah Herring, legal representative, Granger, IN (US)

(73) Assignee: Federal Mogul World Wide, Inc., Southfield, MI (US)

( * ) Notice: Subject to any disclaimer, the term of this patent is extended or adjusted under 35 U.S.C. 154(b) by 941 days.

(21) Appl. No.: 11/923,311

(22) Filed: Oct. 24, 2007

(65) Prior Publication Data

US 2008/0098556 A1    May 1, 2008

Related U.S. Application Data

(60) Provisional application No. 60/863,010, filed on Oct. 26, 2006.

(51) Int. Cl.
*B60S 1/34* (2006.01)

(52) U.S. Cl. .............. 15/250.352; 15/250.351

(58) Field of Classification Search ............ 15/250.351, 15/250.352, 250.34, 250.19
See application file for complete search history.

(56) References Cited

U.S. PATENT DOCUMENTS

| | | |
|---|---|---|
| 3,729,767 A | 5/1973 | Edele et al. |
| 4,251,899 A | 2/1981 | Hoyler |
| 4,564,971 A | 1/1986 | Pethers et al. |
| 4,704,761 A | 11/1987 | South et al. |
| 4,741,068 A | 5/1988 | Roth |
| 4,991,251 A | 2/1991 | Egner-Walter et al. |
| 5,079,793 A | 1/1992 | Isii |
| 5,165,159 A | 11/1992 | Egner-Walter et al. |
| 5,435,042 A | 7/1995 | Arai et al. |
| 6,223,778 B1 | 5/2001 | Bucher et al. |
| 6,394,688 B1 | 5/2002 | Kraemer |
| 6,553,608 B2 | 4/2003 | Kraus et al. |
| 6,658,691 B2 | 12/2003 | Muramatsu |
| 6,782,581 B2 | 8/2004 | Block |
| 2002/0144373 A1 | 10/2002 | Muramatsu |

FOREIGN PATENT DOCUMENTS

| | | |
|---|---|---|
| JP | 63017149 | 1/1988 |
| JP | 10129424 | 5/1998 |
| JP | 2001001868 | 1/2001 |
| JP | 2001010450 | 1/2001 |
| JP | 2004249823 | 9/2004 |
| JP | 2006240364 | 9/2006 |

*Primary Examiner* — Gary Graham
(74) *Attorney, Agent, or Firm* — Robert L. Stearns; Dickinson Wright, PLLC

(57) ABSTRACT

A wiper arm assembly and method of assembly thereof includes a mounting head and a wiper arm configured for relative rotation during assembly from a disassembled position to a shipping position, wherein the wiper arm and mounting head are locked against rotation toward the disassembled position once in the shipping position. The mounting head and wiper arm have locking surfaces configured for locked engagement with one another while in the shipping position. The locking surfaces are brought into engagement with one another by a force imparted by a spring while rotating the mounting head relative to the wiper arm from the disassembled position toward the shipping position. When in the shipping position, the locking surfaces confront each other and prevent the mounting head and the wiper arm from rotating back toward the disassembled position from the shipping position.

4 Claims, 4 Drawing Sheets

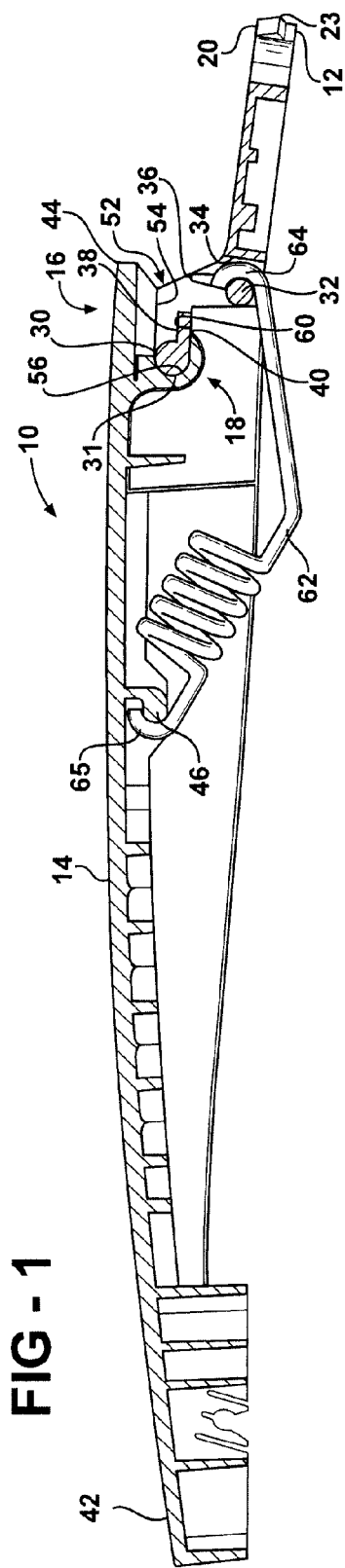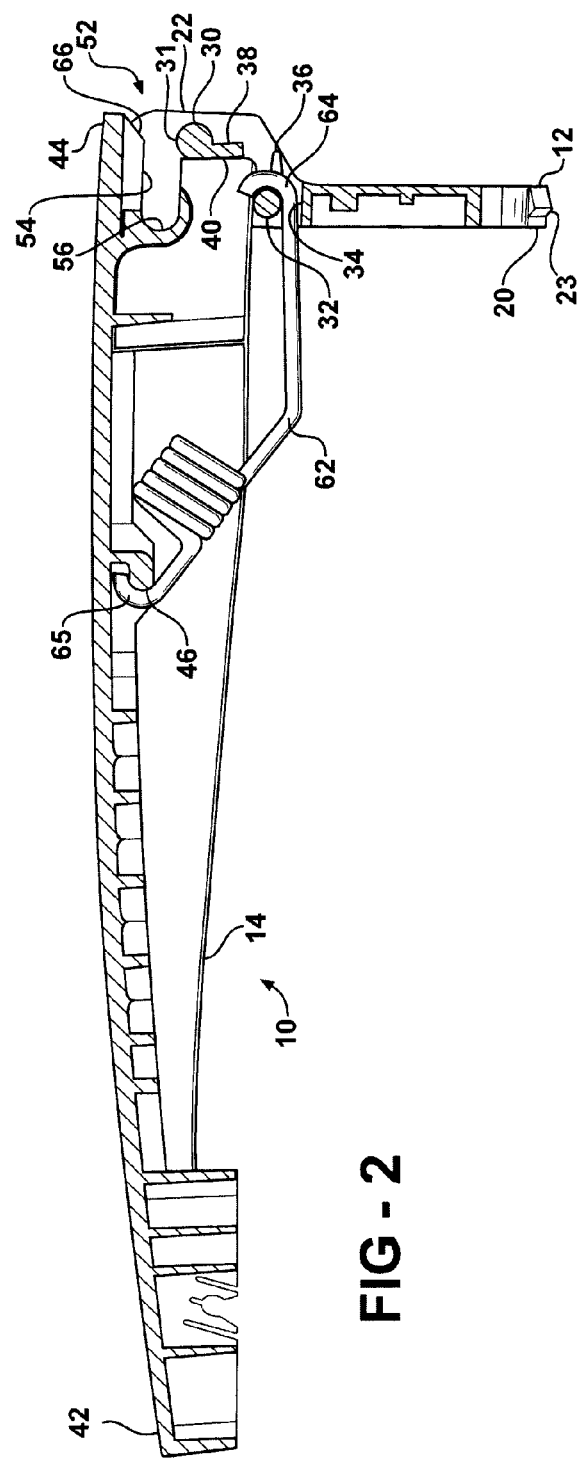

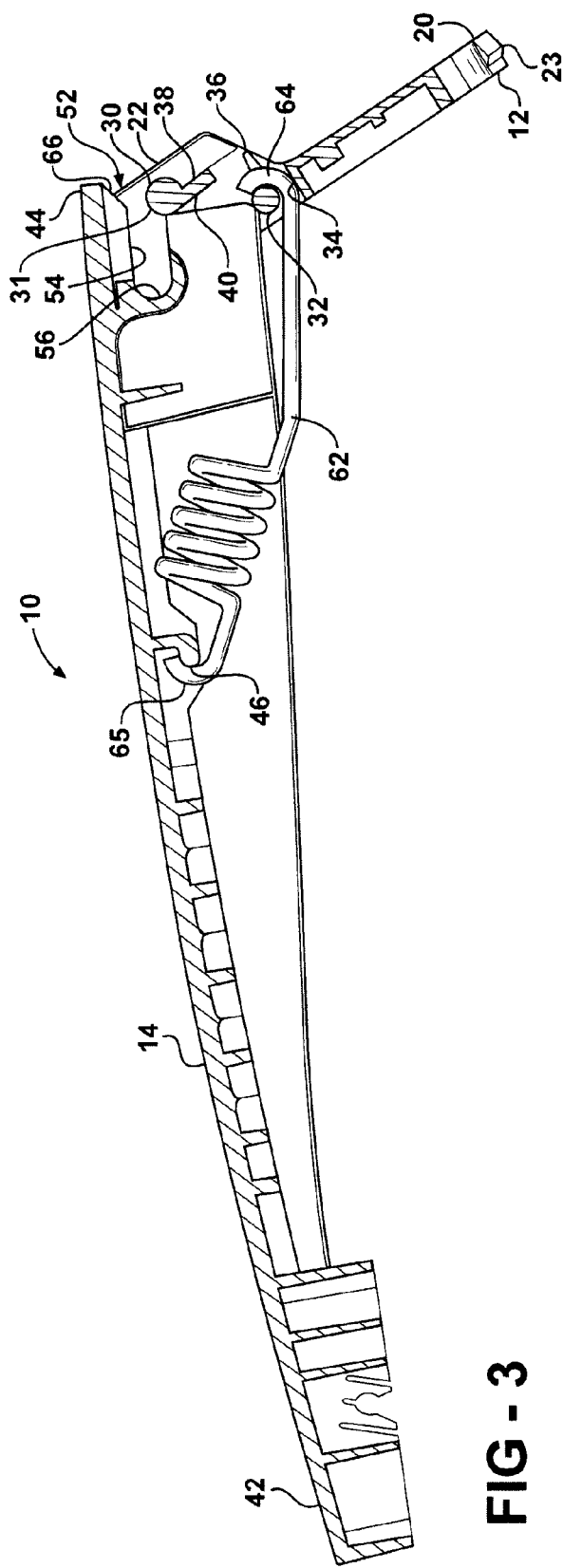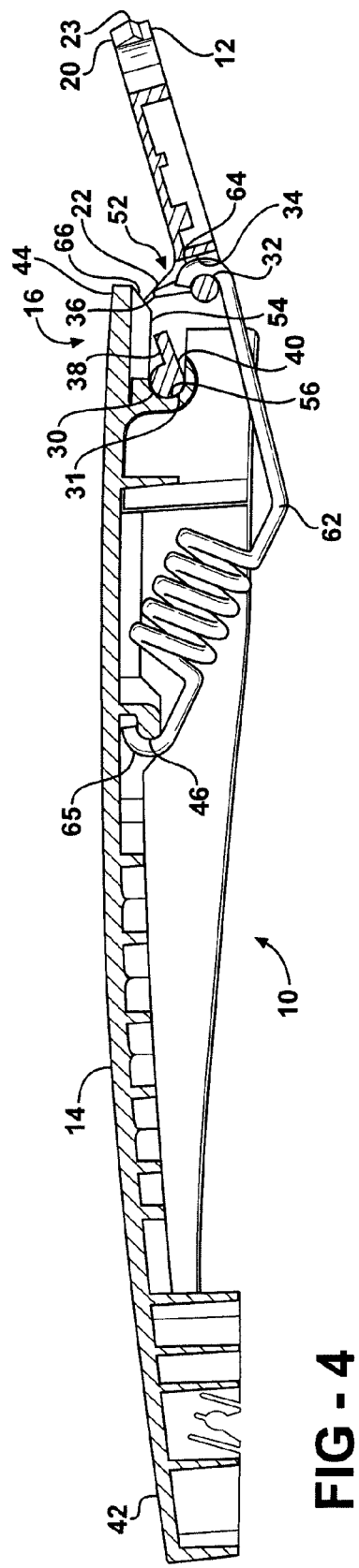

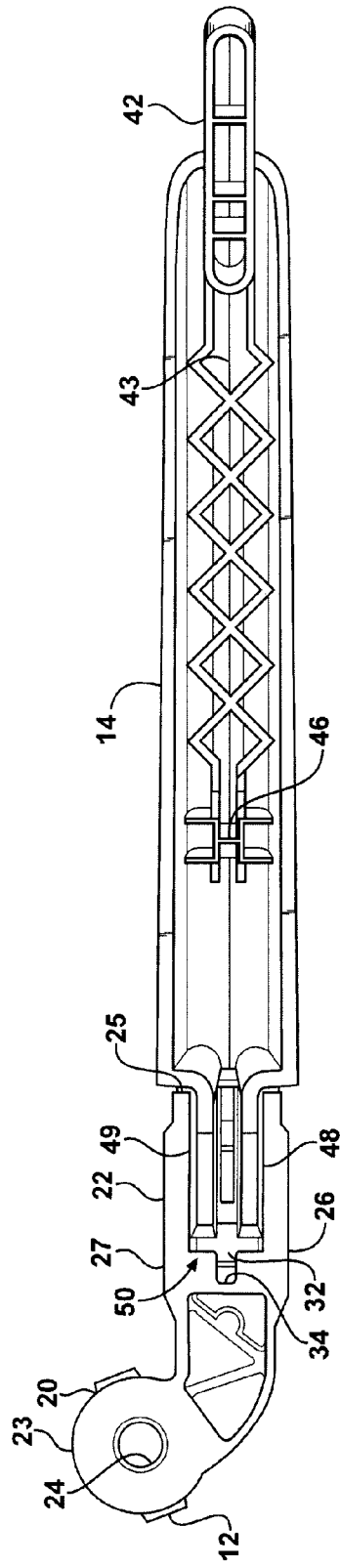
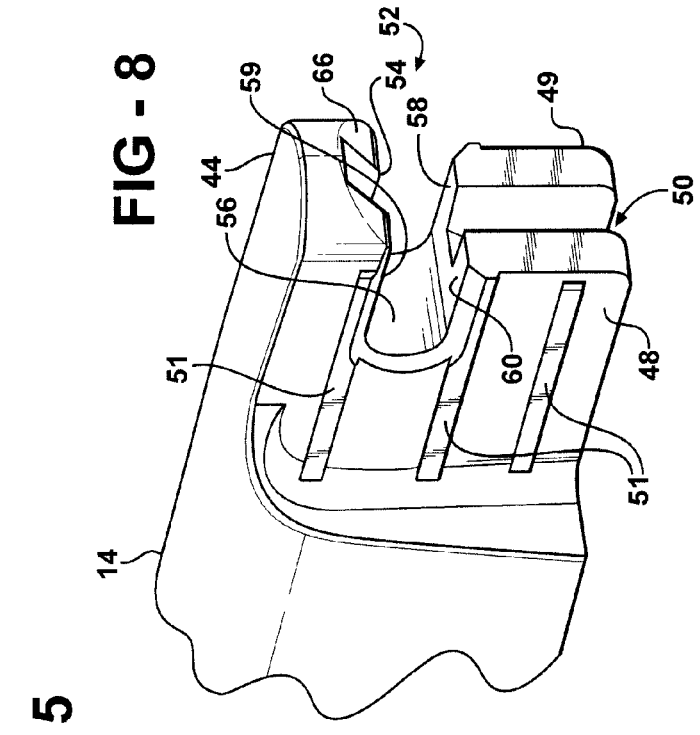
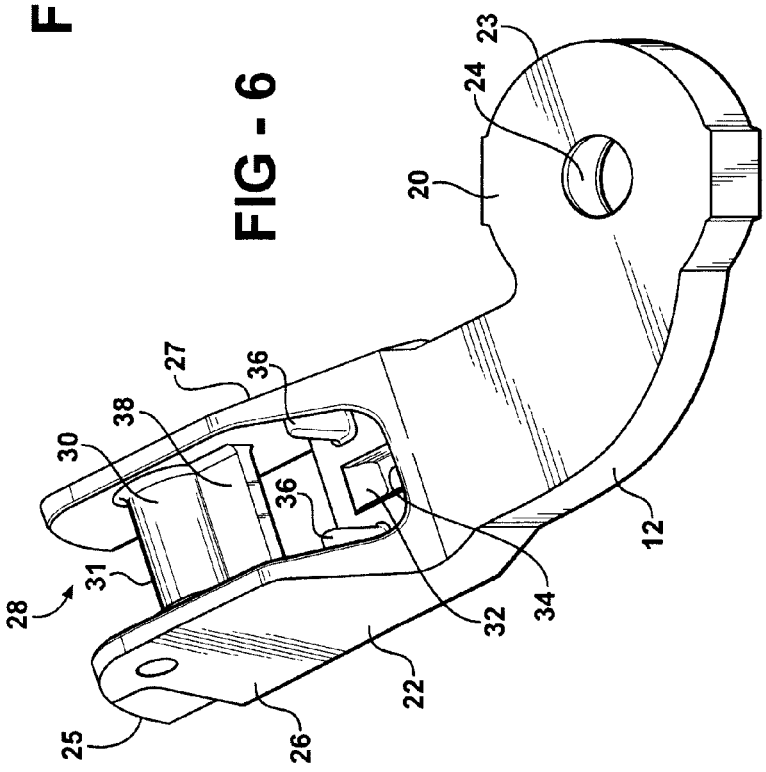

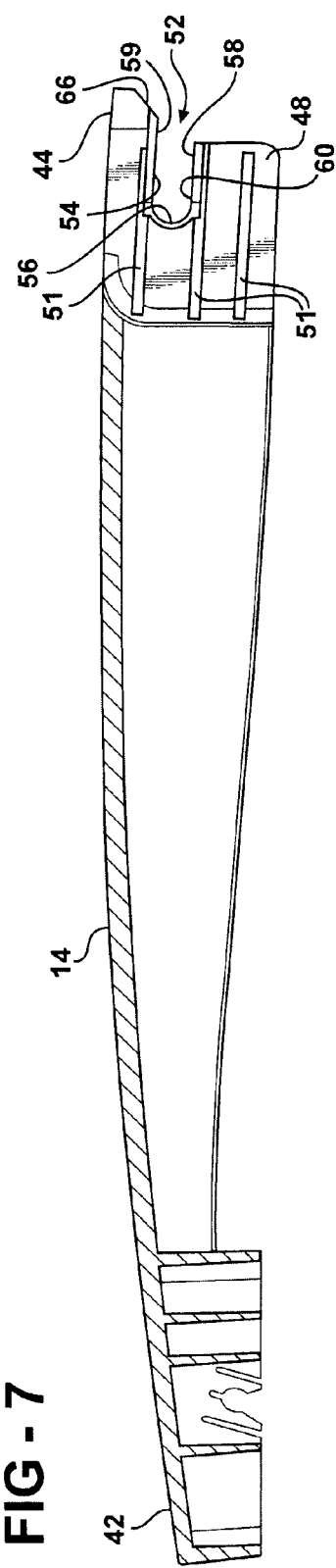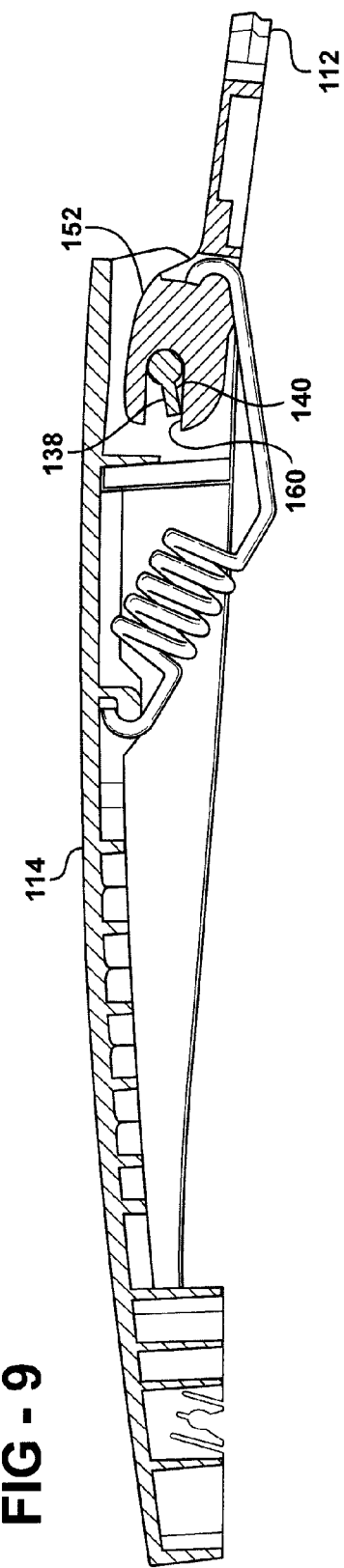

WIPER ARM ASSEMBLY HAVING A LOCKING MEMBER

CROSS-REFERENCE TO RELATED APPLICATION

This application claims the benefit of U.S. Provisional Application Ser. No. 60/863,010, filed Oct. 26, 2006, which is incorporated herein by reference in its entirety.

BACKGROUND OF THE INVENTION

1. Technical Field

This invention relates generally to wiper arm assemblies for vehicles, and more particularly to wiper arm assemblies having a mounting head for attachment to a vehicle and a wiper arm attached for articulation relative to the mounting head, and methods of assembly thereof.

2. Related Art

Wiper arm assemblies for vehicles are known to have a wiper arm hinged for articulation relative to a mounting head. The mounting head facilitates attachment of the assembly to a surface on the vehicle so that a wiper blade attached to the wiper arm is suitably positioned for oscillation against a window. The wiper arm and wiper blade attached thereto can generally be articulated relative to the mounting head away from the window to a service-up position to facilitate replacing the wiper blade.

It is known to manufacture wiper arm assemblies with the mounting head and wiper arm permanently fixed to one another by a staked pin or rivet. In this type of construction, the pin or rivet is assembled between axially aligned openings in the mounting head and wiper arm, and then the pin or rivet is fixed therein to permanently couple the parts together sot that they can not be taken apart thereafter. At some point in assembly, one end of a coil spring is attached to the mounting head, and an opposite end of the coil spring is attached to the wiper arm. The force imparted by the coil spring maintains the wiper blade in wiping engagement with the window as the mounting head is oscillated by a drive motor. The spring also allows the wiper arm to be articulated away from the window by manually lifting the wiper arm, such that the wiper blade can be serviced, as necessary. Though this type of wiper arm assembly works well in use, it typically comes with increased cost in manufacturing and assembly due to the added cost associated with the pin or rivet and the processes for permanently fixing the mounting head and wiper arm together.

It is also known to manufacture wiper arm assemblies with the mounting head and wiper arm attached to one another such that they can be disassembled from one another after being assembled in a "preassembled" position. A preassembled position is defined when the mounting head and wiper arm are attached together, but not yet assembled to a vehicle. In one known construction, as disclosed in the prior art section of U.S. Pat. No. 6,553,608 (the '608 patent), the mounting head and wiper arm are attached together under a preload of a tension spring, with an axle on one of the parts being received to form a hinged connection in an open hub of the other part. Bearing surfaces on the mounting head and wiper arm are pulled into engagement with one another along a line of force imparted by the tension spring. The opposing reaction forces between the bearing surfaces act to maintain the mounting head and wiper arm in the preassembled position until the wiper arm assembly is fully assembled to a vehicle. Unfortunately, the bearing surfaces are not prevented from moving back toward a disassembled direction and can slide relative to one another under a minimal force, which can occur during transport or during careless handling, whereupon the mounting head and wiper arm can become inadvertently disassembled.

To combat the problem of inadvertent disassembly set out in the prior art section of the '608 patent, the '608 patent teaches forming the bearing surfaces as being arranged to define interacting camming surfaces. In order for the mounting head and wiper arm to be disassembled from their preassembled position, the bearing surfaces require the spring attaching the mounting head and the wiper arm to be increased in length, thus requiring an increased tensile force to be overcome prior to the parts becoming disassembled from one another. Upon the bearing surfaces overcoming a cam lobe, the point at which the tensile spring is at its greatest length, the length of the spring is allowed to decrease, thereby causing a tensile force imparted by the spring to disassemble the mounting head and the wiper arm from one another. Accordingly, the '608 patent teaches that the mounting head can still be disassembled from the wiper arm by rotating the wiper arm relative to the mounting head toward the disassembled direction with a sufficient torque to overcome the cam lobe.

SUMMARY OF THE INVENTION

A wiper arm assembly has a mounting head and a wiper arm configured for relative rotation with one another from a disassembled position toward and assembled shipping position, wherein the wiper arm and mounting head are locked against rotation toward the disassembled position upon being assembled in the shipping position. The mounting head has one of an axle or a hub, while the wiper arm has the other of the axle or hub. The hub has a pocket with an open end for receipt of the axle for rotation therein. A spring is arranged for operable attachment to the mounting head and the wiper arm. The mounting head and wiper arm have locking surfaces configured for locked engagement with one another while in the shipping position. The locking surfaces are brought into confronting engagement with one another under a force imparted by the spring while rotating the mounting head relative to the wiper arm from a disassembled position toward the shipping position. When in the shipping position, the locking surfaces confront each other and prevent the mounting head and the wiper arm from rotating back toward the disassembled position from the shipping position.

Another aspect of the invention provides a method of assembling a wiper arm assembly. The method includes providing a mounting head having a locking surface and one of an axle or a hub and further providing a wiper arm having a locking surface and the other of the axle or the hub, wherein the hub has a pocket with an open end for receipt of the axle. Then, operably attaching a spring to the mounting head and the wiper arm. Further, rotating the mounting head and the wiper arm relative to one another from a disassembled position toward a shipping position and causing the spring to initially increase in preload prior to reaching the shipping position and the axle to be received in the hub under a force imparted by the spring. Lastly, bringing the locking surfaces on the mounting head and the wiper arm into confronting engagement with one another in a direction of rotation while in the shipping position and preventing the mounting head and the wiper arm from rotating back toward the disassembled position.

Accordingly, a wiper arm assembly constructed in accordance with the invention, by way of example and without limitation, provides a wiper arm assembly that is easy to assemble, economical in manufacture, prevented from becoming inadvertently disassembled from a shipping position, and has a long and useful life.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a cross-sectional view taken generally along a central axis of a wiper arm assembly constructed according to one presently preferred embodiment of the invention shown in a shipping position;

FIG. 2 is a view similar to FIG. 1 while in a disassembled position;

FIG. 3 is a view similar to FIG. 1 while in a partially assembled position;

FIG. 4 is a view similar to FIG. 1 while in a service-up position;

FIG. 5 is a bottom view of the wiper arm assembly with a spring removed;

FIG. 6 is a perspective view of a mounting head of the wiper arm assembly;

FIG. 7 is a side view of a wiper arm of the wiper arm assembly;

FIG. 8 is partial perspective view of the wiper arm; and

FIG. 9 is a cross-sectional view taken generally along a central axis of a wiper arm assembly constructed in accordance with another embodiment of the invention.

DETAILED DESCRIPTION OF PRESENTLY PREFERRED EMBODIMENTS

Referring in more detail to the drawings, FIGS. 1-4 show a wiper arm assembly 10 constructed according to one presently preferred embodiment of the invention. The wiper arm assembly 10 has a mounting head 12 to facilitate attachment of the assembly 10 to a vehicle, and a wiper arm 14 for operable attachment of a wiper blade (not shown) to the assembly 10. The wiper arm 14 is attached for articulated movement to the mounting head 12 via a hinged joint 16 so that the wiper arm 14 can be pivoted in use and during assembly to a vehicle between a preassembled state or position, referred to hereafter as a shipping position (FIG. 1), and a fully assembled state or position (not shown), wherein the assembly 10 is mounted to a vehicle. While in the shipping position, a locking mechanism 18 acts between the mounting head 12 and wiper arm 14 to prevent them from pivoting or rotating from the shipping position back toward a disassembled state or position (FIG. 2). Accordingly, the wiper arm assembly 10 is prevented from becoming inadvertently disassembled, such as during shipping or while being handled prior to being attached to the vehicle.

As best shown in FIG. 6, the mounting head 12 has a mounting portion 20 and a hinge portion 22. The mounting portion 20 preferably has an opening 24 adjacent an end 23 to facilitate attachment of the assembly 10 to the vehicle via a standard fastener. The hinge portion 22 is adjacent an end 25 opposite the opening 24, and is adapted to allow the wiper arm 14 to articulate relative to the mounting head 12. The mounting head 12 has a pair of laterally spaced sidewalls 26, 27 defining a generally open channel 28 therebetween. An axle 30 of a predetermined diameter extends between the sidewalls 26, 27. The axle 30 preferably defines a generally cylindrical bearing surface 31 facing the end 25 and being spaced a predetermined distance from the end 25. The mounting head 12 has a spring attachment feature, represented here, by way of example and without limitations, as a spring pin 32 extending between the sidewalls 26, 27. To further define the attachment feature, a through opening 34 is preferably formed adjacent the spring pin 32. The spring pin 32 is located generally between the axle 30 and the mounting portion 20. The mounting head 12 preferably has at least one, and shown here as a pair of stop surfaces 36 (FIGS. 1-4, and 6) arranged to limit the degree of pivot of the wiper arm 14 upwardly from the mounting head 12, from the fully assembled position while on the vehicle to the service-up position (FIG. 4). It should be recognized that the degree of movement between the assembled position and the service-up position can be varied, as desired, by altering the stop surfaces 36.

As shown in FIGS. 1-4 and 6, the locking mechanism 18 is defined in part on the mounting head 12 by a locking member 38. The locking member 38 is represented here as extending between the sidewalls 26, 27 substantially along the length of the axle 30 and away from the axle 30 rearwardly toward the mounting portion 20. It should be recognized that the locking member 38 could be separate and detached from the axle 30, and it also could be formed as extending less than the entire distance between the sidewalls 26, 27, if desired. The locking member 38 has a locking surface 40, shown here, by way of example and without limitations, as being generally flat.

As best shown in FIGS. 1-4 and 7, the wiper arm 14 has an elongate body extending along a longitudinal axis 43 between opposite ends 42, 44, with one end 42, for example, being adapted for attachment of the wiper blade, and the other end 44 being arranged for pivotal attachment to the mounting head 12. To facilitate attachment to the mounting head 12, the wiper arm 14 has a spring attachment feature, shown here as a spring hook 46, attached to a bottom surface of the wiper arm 14, and preferably formed as one piece therewith. As shown in FIGS. 5 and 8, the end 44 has a pair of sidewalls 48, 49 laterally spaced from one another by a centrally extending spring channel 50. The sidewalls 48, 49 have outer surfaces arranged for close receipt between the sidewalls 26, 27 of the mounting head 12 and within the hinge portion 22. Preferably, to minimize friction in use, the sidewalls 48, 49 have ribs 51 (FIGS. 7 and 8) extending outwardly therefrom generally along their length. The end 44 has a hub 52, preferably formed as a monolithic piece of material with the wiper arm 14, although it could be formed as a separate piece and attached thereafter. The hub 52 is defined at least in part by a pocket 54 extending into the end 44 a predetermined distance to a bearing or seating surface 56. The seating surface 56 is preferably cylindrical to conform generally to the generally cylindrical bearing surface 31 on the axle 30. As best shown in FIGS. 7 and 8, the pocket 54 is defined in part by oppositely spaced lower and upper walls 58, 59, respectively, preferably spaced from one another for close receipt of the axle 30, such that the axle 30 can oscillate within the pocket 54. The lower and upper walls 58, 59 are shown here, for example, as being substantially parallel to one another, with one of the walls 58 defining a locking surface 60 that is arranged for confronting engagement with the locking surface 40 on the mounting head 12 (FIG. 1).

To assemble the mounting head 12 to the wiper arm 14, a spring, shown here as a coil spring 62, is tensioned between the mounting head 12 and the wiper arm 14. The coil spring 62 has hooked, generally c-shaped opposite ends 64, 65, with one end 64 being attached to the spring pin 32 of the mounting head 12 and the other end 65 being attached to the spring hook 46 of the wiper arm 14. Upon attaching the coil spring 62, the wiper arm assembly 10 is in its disassembled state or position (FIG. 2). While in the disassembled position, the wiper arm assembly 10 is able to readily fall apart. The axle 30 is in abutting contact with the end 44 of the wiper arm 14 adjacent the pocket 54 of the hub 52.

To proceed in assembly of the mounting head 12 to the wiper arm 14, the mounting head 12 and wiper arm 14 are rotated relative to one another, with the mounting head 12 moving counter clockwise, as viewed in FIG. 3, wherein the mount head 12 and wiper arm 14 are shown in a partially assembled position. In this position, the axle 30 begins to enter the pocket 54 with the locking member 38 attached thereto, such that the locking member 38 moves conjointly with the axle 30. In the partially assembled position, the coil spring 62 is increased in length from that of the disassembled position, thus, increasing the tension force in the spring 62. The mounting head 12 and wiper arm 14 are rotated further during assembly wherein the axle 30 and the locking member 38 are received in the pocket 54 so that the tension force imparted by the coil spring 62 pulls the axle 30 and the locking member 38 toward the seating surface 56.

As the axle 30 is pulled into engagement with the seating surface 56, the locking member 38 is swung into the pocket 54 and translated generally linearly along a portion of the locking surface 60 of the pocket lower wall 58. The locking surface 40 of the locking member 38 remains engaged with the locking surface 60 of the pocket lower wall 58 under the biasing tension of the spring 62 while in the shipping position (FIG. 1). Accordingly, once in the shipping position, the wiper arm assembly 10 is locked against disassembly via rotation of the wiper arm 14 relative to the mounting head 12. If the assembly 10 is to be disassembled, translation of the mounting head 12 relative to the wiper arm 14 is required to clear the respective locking surfaces 60, 40 from engagement with one another. As such, a linear force sufficient to overcome the tensile force imparted by the spring 62 must be applied between the mounting head 12 and the wiper arm 14 to translate the axle 30 and locking member 38 outwardly from the pocket 54. Accordingly, once in the shipping position, the wiper arm assembly is assured of not becoming inadvertently disassembled.

While in the shipping position, the locking member 38 remains spaced from the upper wall 59 a predetermined distance, such that the wiper arm 14 is able to be pivoted upwardly from a fully assembled position while mounted on the vehicle to the service-up position (FIG. 4). While in the service-up position, the stop surfaces 36 engage an abutment surface 66 on the wiper arm 14 to limit the pivoting movement of the wiper arm 14 relative to the mounting head 12. Accordingly, the locking member 38 is preferably slightly spaced from the upper wall 59 of the pocket 54 while in the service-up position. Of course, if desired, the locking member 38 could be arranged to engage the upper wall 59 to define the service-up position.

Obviously, many modifications and variations of the present invention are possible in light of the above teachings. For example, as shown in FIG. 9, the axle 30 and the hub 52 could be constructed in the reverse orientation. Accordingly, an axle 130 could be attached to a wiper arm 114, and a hub 152 could be formed or attached on a mounting head 112. Accordingly, a locking member 138 and corresponding locking surface 140 could be attached on the wiper arm 114, and a corresponding locking surface 160 could be formed on the mounting head 112. It is, therefore, to be understood that within the scope of the appended claims, and any other claims allowed which stem from this application, that the invention may be practiced otherwise than as specifically described and shown.

What is claimed is:

1. A wiper arm assembly, comprising:
a mounting head;
a wiper arm having one of an axle or a hub, said mounting head having the other of said axle or hub, said hub having a pocket with an open end for receipt of said axle for rotation therein;
a spring arranged for operable attachment to said mounting head and said wiper arm;
said mounting head and said wiper arm having locking surfaces configured to move into locked engagement with one another in a shipping position under a force imparted by said spring while rotating said mounting head and said wiper arm relative to one another from a disassembled position toward said shipping position, said locking surfaces confronting each other while in said shipping position and preventing said mounting head and said wiper arm from rotating back toward said disassembled position from said shipping position;
wherein said axle is attached to said mounting head and one of said locking surfaces is provided by a locking member extending from said axle toward said open end of said hub while in said shipping position; and
wherein said pocket extends from said open end along a pair of substantially parallel upper and lower walls spaced from one another to a seating surface and said locking surface of said locking member is fully received between said upper and lower walls and engages said lower wall when in the said shipping position to prevent rotation of said mounting head and said wiper arm back toward said disassembled position under a torque force.

2. The wiper arm assembly of claim 1 wherein said axle is molded as a single piece of material with said mounting head.

3. The wiper arm assembly of claim 1 wherein said mounting head has a pair of opposite sidewalls and said axle extends between said sidewalls.

4. The wiper arm assembly of claim 3 wherein said locking member extends substantially along a length of said axle.

* * * * *